(12) United States Patent
Lim et al.

(10) Patent No.: US 10,613,005 B2
(45) Date of Patent: Apr. 7, 2020

(54) DEPARAFFINIZATION OF TISSUE BY ELECTRIC FIELD GENERATION AND IONIZATION

(71) Applicant: Agilent Technologies, Inc., Santa Clara, CA (US)

(72) Inventors: Victor Lim, Pacifica, CA (US); Carol T. Schembri, San Mateo, CA (US); Adrienne Mccampbell, Santa Clara, CA (US); Nazumi Alice Yama-Dang, San Jose, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 115 days.

(21) Appl. No.: 15/797,232

(22) Filed: Oct. 30, 2017

(65) Prior Publication Data
US 2018/0120207 A1   May 3, 2018

Related U.S. Application Data

(60) Provisional application No. 62/415,502, filed on Oct. 31, 2016.

(51) Int. Cl.
| | |
|---|---|
| *G01N 1/44* | (2006.01) |
| *G01N 1/36* | (2006.01) |
| *G01N 1/30* | (2006.01) |
| *G01N 1/31* | (2006.01) |
| *G01N 1/40* | (2006.01) |

(52) U.S. Cl.
CPC ............... *G01N 1/44* (2013.01); *G01N 1/30* (2013.01); *G01N 1/312* (2013.01); *G01N 1/36* (2013.01); *G01N 1/40* (2013.01); *G01N 2001/366* (2013.01); *G01N 2001/4038* (2013.01)

(58) Field of Classification Search
CPC ............ G01N 1/44; G01N 1/36; G01N 1/312; G01N 1/30; G01N 1/40; G01N 2001/366; G01N 2001/4038
See application file for complete search history.

(56) References Cited

U.S. PATENT DOCUMENTS

| | | | |
|---|---|---|---|
| 4,034,966 A | 7/1977 | Suh et al. | |
| 6,544,798 B1 * | 4/2003 | Christensen | ............. G01N 1/36 435/40.5 |
| 7,235,140 B1 | 6/2007 | Hayes et al. | |
| 2003/0116281 A1 * | 6/2003 | Herbert | ............. H01J 37/32743 156/379.6 |
| 2013/0309688 A1 | 11/2013 | Barker et al. | |
| 2014/0051118 A1 | 2/2014 | Matthiesen et al. | |
| 2015/0284709 A1 | 10/2015 | Laugharn et al. | |

FOREIGN PATENT DOCUMENTS

JP          2014045689 A       3/2014

OTHER PUBLICATIONS

Samigullin et al. Study of the petroleum schedules thermal cleaning process from asphalt, ressin and paraffin deposits using low temperature plasma. Journal of Physics: Conference Series 669 p. 1-5 (Year: 2016).*
Smith. downloaded from https://www.osti.gov/servlets/purl/12042861. p. 1-13 (Year: 1979).*
Belkind et al. Plasma Cleaning of Surfaces. Vacuum Technology & Coating. 2008. p. 1-11 (Year: 2008).*
Lin et al. High-quality genomic DNA extraction from formalin-fixed and paraffin-embedded samples deparaffinized using mineral oil. Analytical Biochemistry 395 (2009) 265-267 (Year: 2009).*
International Search Report and Written Opinion issued in counterpart PCT Application No. PCT/US2017/058999 dated Feb. 9, 2018 (fifteen (15) pages).

\* cited by examiner

*Primary Examiner* — Taeyoon Kim (57) ABSTRACT

Paraffin-embedded tissue, which may be disposed on a solid substrate, is prepared by a dry technique that removes paraffin from tissue without adding any liquid to the tissue, thereby rendering the tissue substantially free of paraffin. The dry technique may entail applying heat energy to the tissue effective to melt the paraffin and thereby render it flowable, and applying an electric field. The electric field is effective to impart electrical charge to the paraffin and to move the paraffin out from the tissue due to electrical charge repulsion or attraction, which may be assisted by moving an electrode utilized to generate the electric field relative to the paraffin. The electric field, or both the electric field and the heat energy, may be applied until the tissue is substantially free of paraffin.

19 Claims, 4 Drawing Sheets

DEPARAFFINIZATION OF TISSUE BY ELECTRIC FIELD GENERATION AND IONIZATION

RELATED APPLICATIONS

This application claims the benefit under 35 U.S.C. § 119(e) of U.S. Provisional Patent Application Ser. No. 62/415,502, filed Oct. 31, 2016, titled "DEPARAFFINIZATION OF TISSUE BY ELECTRIC FIELD GENERATION AND IONIZATION," the content of which is incorporated by reference herein in its entirety.

TECHNICAL FIELD

The present invention generally relates to the removal of paraffin from paraffin-embedded tissue, such as may be performed, for example, in preparation for staining tissue for microscopic study. More particularly, the invention relates to the removal of paraffin by way of a dry technique that does not entail the addition of any liquid. The dry technique may implement an electric field-based modality in which electrical charge is imparted to the paraffin to be removed.

BACKGROUND

In histology and related fields (e.g., histopathology), a biological specimen such as cellular tissue is collected from a human or animal and then subjected to various processing steps in preparation for being stored for a potentially long period of time and subsequently examined by an analytical instrument such as a light microscope or electron microscope. A typical preparative process may entail fixing, processing (dehydration and stiffener infiltration), embedding, sectioning, drying, and staining.

As an example, a biopsy or surgical procedure is performed to collect tissue for subsequent study. The collected tissue is then placed in a tissue jar containing a chemical fixative such as formalin to stop the natural degradation process. Fixatives crosslink proteins to thereby destroy the functionality of enzymes that degrade tissue. The tissue jar is then transported to a laboratory for further processing. At this time, information regarding the tissue may be entered into a laboratory information system (LIS) and the tissue may be given an identification number.

Next, the tissue sample is sent for grossing. A technician (e.g., a pathologist or other appropriately trained person such as a pathology resident or a histology technician) examines the tissue as it was received. The technician may note the size, condition, and any remarkable features of the tissue, and verbally record observations that are later entered into the LIS. The technician then selects appropriate portion(s) of the tissue for histological examination. The tissue portion(s) are cut to a size that fits easily within the tissue cassette(s) and preferably smaller than that. The tissue portion(s) are placed loosely into a tissue cassette that is labeled with a barcode containing information associated with the tissue and the tissue cassette is closed to secure the tissue therein. A typical tissue cassette has outer dimensions of about 28.5×41×6.7 millimeters (mm), a hinged lid, and flow-through slots or holes to allow the tissue to be immersed in liquid while remaining securely contained inside the tissue cassette. The tissue cassette may then be immersed in a fixative bath for several hours.

The tissue sample is then subjected to processing, which may be automated using a suitable processing apparatus. The entire goal of processing is to completely dehydrate the tissue so that the tissue can be infiltrated with paraffin to make it stiff enough to cut later. The tissue is immersed in alcohol baths of successively increasing alcohol concentrations, for example a 70% ethanol bath for fifteen minutes, followed by a 90% ethanol bath for fifteen minutes, followed by a series of 100% ethanol baths for longer times. Some processors include microwave or acoustic methods to speed up the exchange. Next, the dehydrated tissue is immersed in a xylene (or other clearing agent) bath for twenty minutes to an hour to completely remove the alcohol, as the alcohol is immiscible with paraffin. The last step of processing is to infiltrate the tissue with melted paraffin (usually at about 60° C.) and then cool the tissue to room temperature.

The technician then collects all of the closed, barcoded tissue cassettes containing the tissues and brings them to an embedding station. The embedding station includes a hot melt gun containing melted paraffin and a chill plate. The technician opens one cassette and selects a mold that will comfortably fit the tissue inside the tissue cassette. The technician places a small amount of paraffin in the base of the mold, and then arranges the tissue in the mold as the paraffin solidifies on the chill plate. Orientation of the tissue matters at this point, as the tissue closest to the bottom of the mold will be the tissue that is first cut by a microtome. The technician then fills the rest of the mold with melted paraffin. Next, the technician places the backside of the tissue cassette against the paraffin and may add a further amount of paraffin. The tissue cassette carries the barcode information and acts at a holder for the tissue block. The technician then sets the mold aside until the paraffin hardens, and then removes the tissue block from the mold. The resulting tissue is referred to as formalin fixed paraffin embedded (FFPE) tissue.

The technician then uses a microtome to section (cut) the tissue block to obtain one or more thin slices of the stiffened tissue. Usually the thickness of these tissue slices is on the order of 4 to 6 micrometers (μm), although a range of 1 micrometer to 30 micrometers is not uncommon. For mosts staining protocols, the goal is to get a cross-section of the tissue that is approximately one cell thick. Genomic analysis may have different requirements depending on the amount of tumor in a section. The technician typically starts by trimming away the excess paraffin on the top of the tissue block using the microtome. Once the tissue is exposed, the technician cuts several sections, which tend to form a ribbon. The ribbon is carefully placed in a heated water bath to flatten both the paraffin and the tissue. The technician then singulates the ribbon into individual sections and draws up each section onto a glass microscope slide. At this point, each slide consists of one or two or several sections of tissue and paraffin (both the infiltrating paraffin and the embedding paraffin) held onto the slide by surface tension from a very thin film of water. Each slide is barcoded for identification.

For most staining protocols, the tissue sections need to be carefully dried on the slide, as it is critical that the sections fully adhere to the slides. Drying typically entails air-drying the slides for about twenty minutes in a vertical orientation to allow the water to flow to the bottom of the section and then evaporate. This process puts the tissue into direct contact with the glass microscope slide. Next, the slide is baked at about 60° C. Usually the slide is placed flat on a hot plate or in a heated chamber (e.g., an oven) for about twenty minutes to an hour. There are some variants to the heating apparatus available, but all of them essentially involve the use of heated chambers or hot plates in some form. This process of drying and baking is done to ensure adhesion of the tissue to the slide throughout the staining process and potentially a decade or more of subsequent storage. Tissue that separates from the slide is lost, the consequence of which can be serious such as in the case of a patient who experienced surgery to obtain the tissue sample. Tissue adhesion to non-charged slides may be problematic, however it is routinely performed for H&E stained sections. To help with adhesion, some labs use charged slides so that the negative charges on the proteins and nucleic acids (deoxyribonucleic acid or DNA, and ribonucleic acid or RNA) of the sample interact with positively charged slides. Other labs put an adhesive in the water bath while using plain glass slides to be sure that the tissues adhere to the slides. The length of the drying and baking time varies depending on the subsequent staining process to be performed. The baking protocol is longer for slides that will be stained for immunohistochemistry (IHC) than for the standard hematoxylin and eosin (H&E) staining simply because IHC is a more aggressive chemistry and hence increases the likelihood of tissue sections falling off the slides.

After the tissue has been adhered to the slide, the tissue may be stained. There are many kinds of staining. Normally, a tissue block will have a section mounted on a slide for H&E staining. Hematoxylin stains nucleic acids blue and thus is useful as a marker of the cellular nucleus. Eosin stains proteins pink and thus is useful as a marker of cellular membranes, cytoplasm and extracellular matrix. Pathologists use H&E stained slides to look at the morphology of the tissue structure. Often the pathologist can obtain a diagnosis from studying H&E stained slides alone and does not need any further analysis.

The first step in staining a tissue section is removing the paraffin adhered to the slide and intermixed with the tissue. The traditional sequence of steps involved in removing the paraffin is essentially the opposite of that described above. The slide is dipped in xylene or another clearing agent to dissolve the paraffin and remove it. The slide is then placed into a series of ethanol solutions starting with 100% ethanol composition to remove the xylene and moving down to 70% composition to rehydrate the tissue. Other solvents such as isopropyl alcohol are also becoming popular although they do not work as well as xylene. Then the slide is placed in deionized water.

After removing the paraffin, the slide is stained. For example, the slide may be placed into a hematoxylin solution to stain the nuclei and then rinsed. Subsequently, the slide may be placed into an eosin solution to stain the protein and then rinsed. Next, a mounting solution is placed over the stained tissue and a thin coverslip (very thin glass or plastic) is placed over the tissue and the edges are bonded. The coverslip allows for easier viewing under the microscope.

Some diagnoses require the use of other types of staining. For example, special stains are used to diagnose microbial infections. As another example, IHC is a method of using antibodies to test for the presence of specific proteins. It is used to primarily to characterize cancers more specifically. The staining process is similar to H&E, in that the paraffin needs to be removed and the tissue rehydrated. However, there is an extra step in which the protein antigen in the tissue is "retrieved" by heating the tissue to perhaps 90° C. in various buffers. Once the antigen is retrieved, the antibody is applied. The slide is then washed, and a labeling step is performed to apply color to the slide where the antibody has stuck to the tissue.

From the foregoing, it is evident that the processing of collected tissue for subsequent study involves many steps and a considerable amount of time. Thus, any improvements in such processing that eliminate one or more of these steps and/or reduce the amount of time required would be desirable.

In the case of studying nucleic acids (DNA and RNA), the exposure of tissue to aromatic hydrocarbons in laboratory-grade xylene or xylene substitutes is known to cause oxidation of guanosine nucleotides in DNA and RNA. Xylene causes oxidation of guanosine nucleotides in DNA to 8-hydroxydeoxyguanosine and in RNA to 8-hydroxyguanosine. Oxidized guanosine nucleotides may introduce sequencing artifacts or mutations into the DNA or RNA that are amplified by the polymerase chain reaction (PCR) typically performed for subsequent genomic analysis. Thus, it would be desirable to provide a way to remove paraffin from tissue samples that avoids the use of xylene or xylene substitutes and consequently avoids oxidative damage to guanosine nucleotides, thereby enabling the extraction from tissues of DNA and RNA of superior quality. Technologies that may benefit from superior nucleic acid quality include, for example, DNA microarrays, NANOSTRING™ assaying techniques, quantitative PCR (qPCR), and next generation sequencing technologies. Another technology that may benefit from better-quality nucleic acid is hybridization of DNA or RNA probes to nucleic acids in the tissue for detection of mutations by, for example, fluorescence in situ hybridization (FISH) and chromogenic in situ hybridization (CISH).

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for preparing a tissue includes: providing a tissue embedded with paraffin; and removing the paraffin from the tissue without adding any liquid to the tissue, wherein removing the paraffin renders the tissue substantially free of paraffin.

According to another embodiment, a method for preparing a tissue includes: providing a tissue embedded with paraffin; applying heat energy to the tissue effective to melt the paraffin; applying an electric field effective to ionize the paraffin and to move the ionized paraffin out from the tissue due to electrostatic force; and continuing to apply the electric field until the tissue is substantially free of paraffin.

According to another embodiment, a tissue preparation device includes a heating device configured for applying heat energy according to any of the methods disclosed herein.

According to another embodiment, a tissue preparation device includes an electric field-generating device configured for applying an electrical field according to any of the methods disclosed herein.

According to another embodiment, a tissue preparation device includes: a heating device configured for applying heat energy to a tissue effective to melt paraffin embedded in the tissue; and an electric field-generating device configured for applying an electrical field effective to ionize the paraffin and to move the ionized paraffin out from the tissue due to electrostatic force.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

The present disclosure provides "dry" techniques for removing paraffin from paraffin-laden tissue (i.e., an organized ensemble of biological cells) as an alternative to conventional "wet" (chemical) techniques. A dry technique as disclosed herein is one that does not involve the addition of xylene or other liquids to the tissue. Thus, according to an aspect of the present disclosure, a method for preparing a paraffin-laden tissue includes removing the paraffin from the tissue without adding any liquid to the tissue, such that removing the paraffin renders the tissue substantially free of paraffin. In an embodiment, removing the paraffin from the tissue without adding any liquid to the tissue involves applying energy to the paraffin. In one specific yet non-limiting embodiment, electrical energy and heat energy are applied to the paraffin. The electrical energy creates an energetic environment to which the paraffin is exposed, causing the paraffin to become ionized and thus responsive to the electric field associated with the electrical energy applied. Consequently, the electrical field can be utilized to move (e.g., push or pull) the ionized paraffin out from the tissue. The heat energy is applied to render the paraffin flowable, thus facilitating movement of the paraffin out from the tissue. Thus, according to another aspect of the present disclosure, a method for preparing a paraffin-laden tissue includes applying heat energy to the tissue effective to melt the paraffin, and applying an electric field effective to ionize the paraffin and to move the ionized paraffin out from the tissue due to electrostatic force. The electric field, or both the electric field and the heat energy, continue to be applied until the tissue is substantially free of paraffin.

As used herein, the phrase "substantially free of paraffin" may mean that a tissue subjected to a dry technique for removing paraffin as disclosed herein thereafter can be successfully stained by routine techniques (e.g. H&E or FISH), because any residual paraffin (i.e., the paraffin still remaining in the tissue after being subjected to the method) is too low to interfere with the process of staining. As another example, in a tissue substantially free of paraffin, the residual paraffin may not be visible to the naked (unaided) eye, but may be observed as a thin film with the use of a microscope, such as for example a microscope equipped with polarized lenses. As another example, the tissue substantially free of paraffin is stable at room temperature for an extended period of time (e.g. overnight) due to the absence of liquid, and can be readily stained after the extended period of time.

As another example, a tissue "substantially free of paraffin" may refer to a tissue that, after being subjected to a dry technique for removing paraffin as disclosed herein, is greater than 98% free of paraffin, i.e., contains less than 2% residual paraffin, or less than 1% residual paraffin, or less than 0.5% residual paraffin, or less than 0.4% residual paraffin, or less than 0.3% residual paraffin, or less than 0.2% residual paraffin, or less than 0.1% residual paraffin, or less than 0.05% residual paraffin, or less than 0.01% residual paraffin, etc.

As used herein, the phrase "removing substantially all of the paraffin" may mean removing greater than 98% of the original paraffin in a tissue. As examples, the amount of residual paraffin remaining in the tissue (after subjecting the tissue to a dry technique for removing paraffin as disclosed herein) may be less than 2%, or less than 1%, or less than 0.5%, or less than 0.4%, or less than 0.3%, or less than 0.2%, or less than 0.1%, or less than 0.05%, or less than 0.01%, etc., of the amount of the original paraffin in the tissue.

A non-limiting example of an embodiment of a dry technique for removing paraffin from tissue, utilizing an electric field modality assisted by a heating modality, will now be described.

Figure 1:
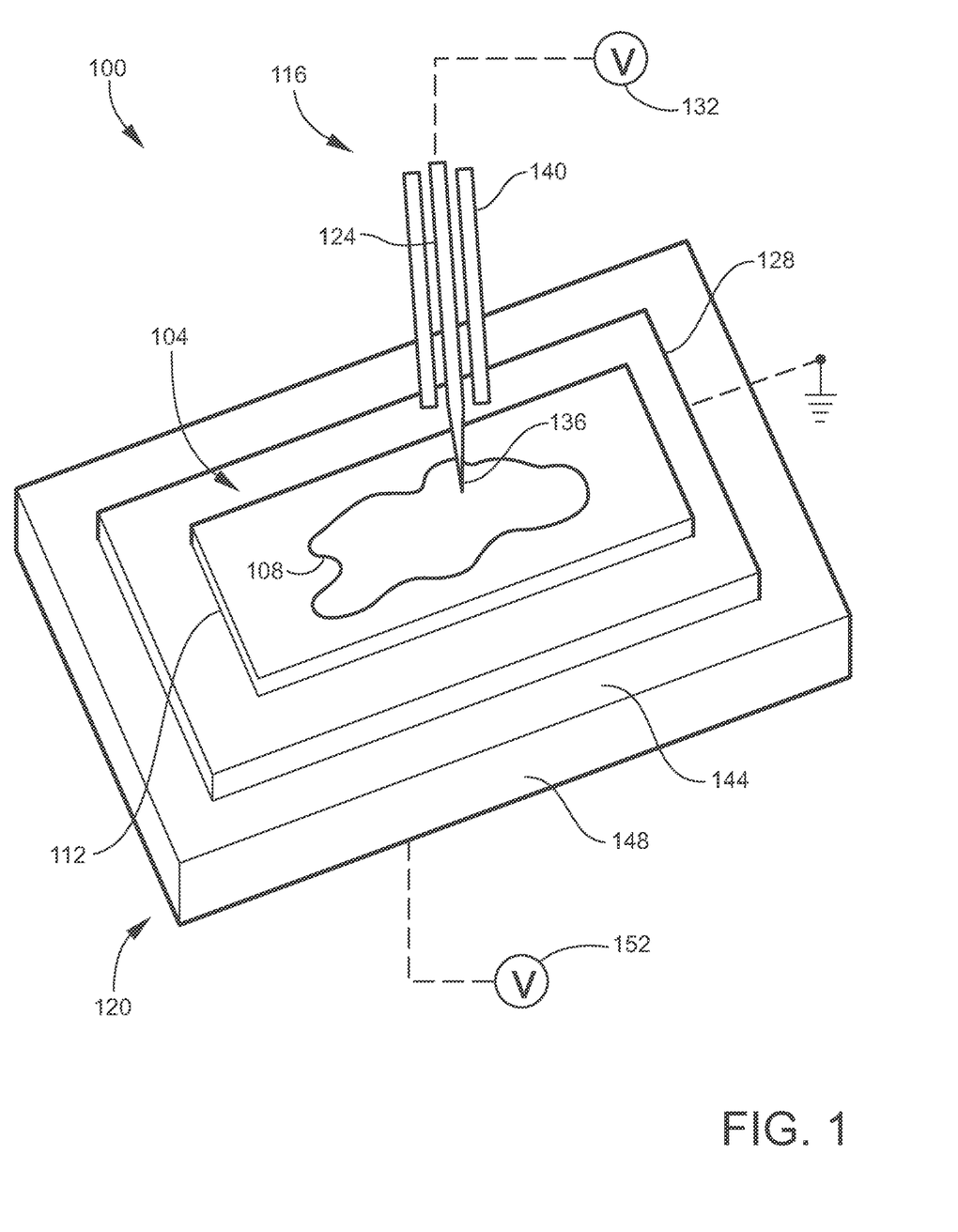
FIG. 1 is a schematic perspective view of a tissue sample preparation device (or paraffin removal device) according to an embodiment.

FIG. 1 is a schematic perspective view of a tissue preparation device 100 according to an embodiment. The device 100 may also be referred to as a paraffin removal device or a tissue deparaffinization device. FIG. 1 also illustrates a supported tissue arrangement 104 that includes a tissue 108, which may also be referred to as a tissue sample, disposed on an upper surface of a solid substrate 112 (e.g., a microscope slide). The tissue 108 may be adhered to the solid substrate 122, or alternatively may freely rest on the in an unbound manner. For example, the tissue sample 104 may have been collected and processed as described above in the background section of the present disclosure. Thus, when initially provided for processing by the device 100, the tissue 108 is impregnated with paraffin. In addition to a slide, other examples of solid substrates include, but are not limited to, a plate, a frit, beads, a porous medium, a filter, and a container. The device 100 is configured for removing paraffin from a tissue 108, which may be done in preparation for staining as described above, or for other desired processing or analysis. The substrate 112 may have a higher surface energy than the paraffin and/or the tissue 108, so that after the paraffin is removed the tissue 108 adheres to the substrate 112.

Generally, the device 100 includes an electric field-generating device 116, and may further include a heating device 120.

The electric field-generating device 116 includes an electrode arrangement, such as one or more movable first electrodes (or discharge electrodes) 124 and one or more (typically stationary) second electrodes (or counter-electrodes) 128, and an appropriate voltage source (or electrical power supply) 132. The voltage source 132 may be a direct current (DC) voltage source or alternating current (AC) voltage source. As an AC voltage source, the voltage source 132 in some embodiments may be a high-frequency voltage source such as a radio-frequency (RF) voltage source or a microwave-frequency voltage source. At least the first electrode 124 is in electrical communication with the voltage source 132. Depending on the embodiment, the second electrode 128 may be in electrical communication with the voltage source 132 or may be coupled to electrical ground.

In one non-exclusive example, the voltage source 132 is a high-voltage source capable of applying a DC voltage potential to the first electrode 124 on the order of kilovolts (kV). For example, voltage potential (relative to ground) may be in a range (in absolute value) from about 1000 V (1 kV) to about 30,000 V (30 kV). The voltage potential applied may be positive or negative, i.e., the range may be from about +1000 V to about +30,000 V or from about −1000 V to about −30,000 V. The foregoing range is merely one example. Depending on the embodiment, the voltage potential may be less than 1000 V or greater than 30,000 V. More generally, the voltage source 132 is capable of applying a DC or AC voltage to the first electrode 124 at a magnitude (or in the case of AC power, a peak-to-peak amplitude and frequency) that is sufficient or effective to strike and maintain a corona discharge or plasma in the environment in which the first electrode 124 and the tissue 108 are located.

In some embodiments, the first electrode 124 may include a (highly) curved feature configured to generate a region of elevated electric field strength surrounding the first electrode 124. For example, the curved feature may be a sharp or geometrically abrupt feature, such as an edge or a pointed tip, or a small-diameter wire. In the illustrated embodiment, the first electrode 124 is configured as an elongated rod that terminates at a distal electrode tip 136. The first electrode 124, or at least a tip section thereof that terminates at the distal electrode tip 136, may be tapered such that the distal electrode tip 136 is sharp or pointed. Generally, a sharper distal electrode tip 136 generates a stronger electric field at the distal electrode tip 136, as compared to a more blunt geometry. Thus, the first electrode 124 may be configured as a needle or pin (e.g., a corona discharge needle). In some embodiments, the first electrode 124 may be coaxially surrounded by a body 140 (shown in cross-section in FIG. 1) composed of an electrically insulating material. The electrically insulating material may also be a sufficiently thermally insulating material, or the body 140 may further include a thermally insulating material coaxially surrounding the electrically insulating material. The insulating body 140 may be configured to be hand-held by a user. That is, the first electrode 124 may be configured as a hand-piece that is held by a user like a pen. Alternatively, the insulating body 140 may be configured to be mounted to an automated device (e.g., a motorized stage or robot) as appreciated by persons skilled in the art. Thus, depending on the embodiment the first electrode 124 may be movable relative to the tissue 108 in a manual or automated manner.

The second electrode 128 is typically configured to serve as a counter-electrode or ground plane. The second electrode 128 may be positioned so as to cooperate with the first electrode 124 in defining the location and spatial orientation of the electric field and plasma generated by the applied voltage. In some embodiments and as illustrated, the second electrode 128 is positioned on a side of the tissue 108 opposite to the first electrode 124. In other words, the tissue 108 is positioned between the first electrode 124 and the second electrode 128. In other embodiments, the second electrode 128 may be positioned above the tissue 108, or juxtaposed at roughly the same elevation as the tissue 108 relative to some reference plane. In the illustrated embodiment, the second electrode 128 has a thin planar (plate-shaped) geometry of greater planar area than that of the tissue sample 104, and the tissue sample 104 is placed onto the second electrode 128. As one non-limiting example, the second electrode 128 may be a metallic (e.g., aluminum) foil. In other embodiments, the second electrode 128 may have an elongated rod-type geometry similar to the illustrated example of the first electrode 124. In various embodiments, more than one first electrode 124 and/or more than one second electrode 128 may be provided.

In further embodiments, particularly when AC power is utilized, the second electrode 128 may coaxially surround the first electrode 124 such that an electrically insulating portion of the body 140 is interposed between the first electrode 124 and the second electrode 128. In this case, the second electrode 128 may in turn be coaxially surrounded by electrically insulating and/or thermally insulating material, which may be considered as being part of the schematically illustrated body 140.

The device 100 may include electronics that include the voltage source 132 and other appropriate components. The electronics may include, for example, an ON/OFF switch (not specifically shown) for controlling the application of voltage potential to the first electrode 116, a component (e.g., a control knob, not shown) configured for adjusting the level of voltage potential applied to the first electrode 116, etc. Some or all of the electronics may be arranged in a control console of the device 100. In hand-held embodiments, the ON/OFF switch (or both the ON/OFF switch and voltage level adjustment component) may be located at the insulating body 140 so as to be easily accessible by the user. Alternatively, controls such as the ON/OFF switch and voltage level adjustment component may be located at the control console or a foot-operated module.

The heating device 120 generally may have any configuration effective for generating and transferring heat energy to an upper heating surface 144 of the heating device 120. Thus, for example, the heating device 120 may include a body 148 containing one or more resistive heating elements (not specifically shown) in thermal contact with the heating surface 144, and a voltage source (power supply) 152 providing electrical current to the heating elements. Thus in the illustrated embodiment, the second electrode 128 is placed or mounted on the heating surface 144 of the heating device 120, and the tissue 108 and supporting substrate 112 are in turn placed or mounted on the second electrode 128. In the present embodiment, the device 100, including the heating device 120, has an open architecture. Alternatively, the heating device 120 may include chamber in which the first electrode 124, the second electrode 128 and the heating surface 144 are positioned, and into which the tissue 108 and supporting substrate 112 are loaded. As an alternative to resistive heating elements, the heating device 120 may provide one or more radiant heating sources such as infrared (IR) lamps.

Figure 2:
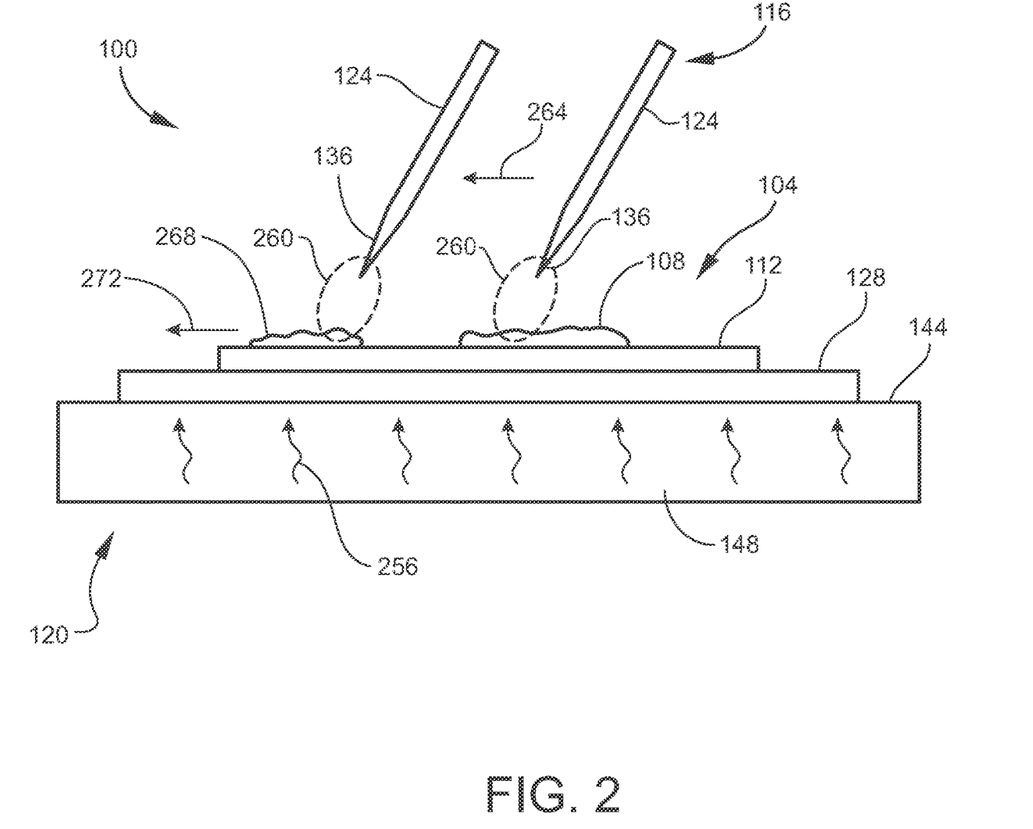
FIG. 2 is a schematic elevation view of the tissue sample preparation device illustrated in FIG. 1, illustrating its operation.

FIG. 2 is a schematic elevation view of the tissue preparation device 100, illustrating its operation. The tissue 108 and supporting substrate 112 are positioned such that they are in thermal contact with the heating surface 144 of the heating device 120, such as by being placed on the second electrode 128. The heating device 120 is then activated to generate and transfer heat energy 256 to the heating surface 144, and consequently to the tissue 108 via heat conduction. A sufficient amount of heat energy 256 is deposited in the tissue 108 to melt the paraffin embedded therein, thereby rendering the paraffin readily flowable. The tissue 108 may be heated to, for example, a temperature in a range of about 35° C. to about 70° C. More generally, the tissue 108 may be heated to the melting point of the paraffin, which falls within the foregoing range.

The electric field-generating device 116 is then activated to generate an electric field of a strength great enough to generate and sustain a corona discharge or plasma 260 in a region around the electrode tip 136 of the first electrode 124, but not so great as to cause electrical arcing between the first electrode 124 and another object such as the second electrode 128. The electric field accelerates free electrons in the air (or other gaseous medium) into collisions with neutrals (neutral atoms and molecules) in the air (or other gaseous medium). Some of the collisions occur at a high enough energy to ionize the impacted neutrals, thereby liberating more electrons and leading to more collisions between free electrons and neutrals. As long as the electric field is present and of sufficient strength, the ionization events continue in a chain-reaction effect termed an electron avalanche. Photons are also generated in the plasma 260 due to recombination events between electrons and positive ions, and contribute to ionization of neutrals as well. The plasma 260 generated by the electric field-generating device 116 generally is a mixture of charged particles (ions and electrons) and neutrals, as well as other energetic species such as metastables and photons.

In some embodiments, the first electrode 124 has a positive polarity relative to the second electrode 128. In this case, the plasma 260 may be a positive corona discharge. Positive ions are repelled from the first electrode 124 and drawn toward the second electrode 128. On the other hand, negative ions are drawn toward the first electrode 124 and repelled from the second electrode 128. Similarly, electrons are drawn toward the first electrode 124 and repelled from the second electrode 128. In other embodiments, the first electrode 124 may have a negative polarity relative to the second electrode 128, in which case the plasma 260 may be a negative corona discharge.

In FIG. 2, the closed dashed line referred to herein as the plasma 260 schematically depicts the outer spatial extent of the plasma 260 (or at least the active plasma), which may also be referred to as the ionization or plasma-forming region. Outside of this region (plasma 260), the electric field is not strong enough to sustain plasma in the air (or other gaseous medium). In other words, plasma is extinguished outside of this region. It will be understood that the plasma 260 is depicted schematically for illustrative purposes. In practice, the actual size and shape of the plasma 260 (e.g., cloud, plume, etc.) may differ appreciably from the schematic depiction shown in FIG. 2.

As depicted in FIG. 2, the energized first electrode 124 is positioned above the tissue 108, and close enough to the tissue 108 that the tissue 108 is exposed to the highly energetic plasma 260. Consequently, the energetic species of the plasma 260 interact with the paraffin to ionize the paraffin molecules. The paraffin ions (i.e., ionized paraffin molecules) are repelled by charged species of the plasma 260 of the same polarity (positive or negative), and by the first electrode 124 if the first electrode 124 has the same polarity as the ionized paraffin. On the other hand, the paraffin is attracted to oppositely charged species of the plasma 260, and to the first electrode 124 if also oppositely charged. Hence, the first electrode 124 can be moved in any desired direction across (over) the tissue 108 and the underlying substrate 112 to move the paraffin by electrostatic force, i.e. by either charge repulsion or attraction depending on the respective polarities of the ionized paraffin and the first electrode 124, out from the tissue 108. Thus, movement of the first electrode 124 in a given direction will either push or pull the ionized paraffin in the same general direction. As one non-limiting example, FIG. 2 depicts the first electrode 124 being moved over (without contacting) the tissue 108 in the left-ward direction (from the perspective of FIG. 2), as indicated by a horizontal arrow 264. In this example, the first electrode 124 and the ionized paraffin have the same polarity. The movement of the first electrode 124 causes the ionized paraffin to be moved in the same left-ward direction, whereby the ionized paraffin leaves the confines of the tissue 108. FIG. 2 also depicts a mass of ionized paraffin 268, having been separated from the tissue 108, being moved away from the tissue 108 along the surface of the substrate 112 in response to the movement of the first electrode 124 and the tip-localized energetic plasma 260 generated thereby. In this example the ionized paraffin 268, still in a flowable (melted) state, flows in the left-ward direction as indicated by a horizontal arrow 272.

A non-limiting example of a method for preparing a tissue will now be described, using the example described above and illustrated in FIGS. 1 and 2. A paraffin-embedded tissue 108 is provided. Providing the tissue 108 may include various processing steps after initially acquiring the tissue 108 from the source, such as fixing, dehydration, alcohol removal, paraffin infiltration/embedding, sectioning, etc. as described herein. In this example, providing the tissue 108 includes positioning (placing or mounting) the tissue 108 on a solid substrate 112, and positioning (placing or mounting) the tissue 108 (supported on the substrate 112) on or near a (second) electrode 128. Heat energy 256 is applied to the tissue 108 as needed to melt the paraffin dispersed in the tissue 108, i.e., to render the paraffin flowable. An electric field is applied that is effective to impart charge to the paraffin by ionizing the paraffin and to move the ionized paraffin out from the tissue 108. In this example, the electric field is generated between a first electrode 124 and the second electrode 128 by applying a voltage potential to the first electrode 124. Further in this example, the electric field applied is effective to generate plasma 260 in a region extending at least between the electrode tip 136 of the first electrode 124 and the tissue 108, whereby paraffin proximate to the electrode tip 136 is exposed to the plasma 260. The first electrode 124 is moved in one or more directions relative to the tissue 108 as needed to move the ionized paraffin out from the tissue 108. Typically, the first electrode 124 is moved while the tissue 108 remains stationary. Alternatively or additionally, the tissue 108 may be moved relative to the first electrode 124. The heat energy and the electric field are applied, and the first electrode 124 is moved, for a duration sufficient to remove all (or substantially all) of the paraffin from the tissue 108. The total duration required may be, for example, a few minutes (e.g., about five minutes). In other words, the method may entail removing substantially all of the paraffin from the tissue.

Depending on the amount of time required to remove all (or substantially all) of the paraffin from the tissue 108, it may or may not be necessary to continue to apply heat energy while the electric field is being applied and the first electrode 124 is being moved. The paraffin needs to be flowable to facilitate its movement out from the tissue 108. Accordingly, the heat energy should be applied for a period of time long enough to prevent the paraffin from re-solidifying during the removal process. Depending on the embodiment, the time period for heat application may or may not overlap with the time period for electric field application.

After the paraffin has been removed from the tissue 108, a staining process may be performed on the tissue 108. For example, the tissue 108 may be stained with a standard staining agent such as hematoxylin and eosin (H&E), or an immunohistochemical (IHC) staining agent or other special staining agent. Other desired processes may be performed on the tissue 108. For example, nucleic acids may be isolated from the tissue 108 and subjected to further processing such as, for example, amplification by polymerase chain reaction (PCR), hybridization, etc.

From the foregoing, it is evident that the tissue preparation device 100 and its method of use may provide a number of advantages. As noted above in the background section of this disclosure, after paraffin-embedded tissue has been sectioned into thin slices, the resulting tissue sections conventionally undergo a critical drying process that ensures the tissue sections are fully adhered to the slides (i.e., solid substrates 112) and thereby will not be lost during subsequent handling or processing. The conventional drying process may take an hour or so to complete. By comparison, the tissue preparation device 100 is effective in removing water from the tissue as well as paraffin. The tissue preparation device allows better adhesion to both non-charged and charged slides than the conventional drying process. Thus, the conventional drying process may be eliminated, which consequently may save nearly an hour or so from the total processing time of the tissue. Accordingly, the tissue preparation device 100 is effective for minimizing drying time while achieving tissue adhesion to the slide, As also noted above, after drying the tissue and before initiating the staining process, the paraffin must be removed from the tissue, which conventionally is performed by dipping the tissue slide in xylene to dissolve the paraffin. The electric field-based deparaffinization process of the present disclosure removes most or substantially all of the paraffin, which minimizes or eliminates the use of xylene for deparaffinization, which is highly desirable given that xylene is a toxic chemical.

Moreover, the electric field-based deparaffinization process of the present disclosure has been found to be compatible with not only standard hematoxylin and eosin (H&E) staining, but also antigen retrieval and staining for immunohistochemistry (IHC).

Furthermore, because xylene-based deparaffinization is minimized or eliminated and accordingly a cause of oxidative damage to guanosine nucleotides is minimized or eliminated, the electric field-based deparaffinization process of the present disclosure may enable and promote the ability to extract nucleic acids (DNA and RNA) of superior quality from tissues. Since tumor tissue may comprise only a portion of a section and only the tumor portion is typically selected for subsequent genomic analysis, multiple sections are routinely cut to obtain sufficient material. The electric field-based deparaffinization process may allow thicker sections to be cut and sufficiently cleared of paraffin to be compatible with genomic analysis kits.

Paraffin removal as described herein may conveniently be carried out under ambient conditions. Ambient air may be utilized as a plasma-forming gas mixture. That is, the plasma utilized may be an air plasma. In other embodiments, the plasma-forming process may be enhanced by providing a flow of one or more specific plasma-forming gases to the ionization (plasma-forming) region in the vicinity of the first electrode. Examples of specific plasma-forming gases include, but are not limited to, diatomic oxygen ($O_2$), diatomic nitrogen ($N_2$), a noble gas such as argon (Ar), etc. A specific plasma-forming gas may be provided by nozzles configured to direct the gas to the ionization region where the gas can be excited by the applied electric-field. Alternatively, the device 100 and the tissue 108 may be positioned in an enclosure that provides a controlled environment (relative to the ambient), and the plasma-forming gas may be flowed into the enclosure. The use of specific plasma-forming gas(es) to modify the composition of the air in the ionization region, or instead or air, may be desired for tuning the conditions (e.g., voltage parameters) under which plasma is generated and sustained, for ensuring that the paraffin is ionized preferentially over other components of the tissue 108 that do not need to be ionized, etc.

Thus far, the mechanism or technique of ionization has been described primarily in the context of a corona discharge-type plasma. The presently disclosed subject matter in its broader aspects, however, is not limited to any specific mechanism of ionization. More generally, any type of ionization suitable for the process of paraffin removal may be utilized. Typically, atmospheric-pressure ionization (API) techniques are contemplated as they do not require operating in an evacuated environment. Examples of API techniques include, but are not limited to, atmospheric-pressure plasma-based ionization, atmospheric-pressure chemical ionization (APCI), atmospheric-pressure photoionization (APPI) (e.g., using a laser, ultraviolet lamp, etc.), inductively coupled plasma (ICP) ionization, microwave induced plasma (MIP) ionization, dielectric barrier discharge (DBD) plasma ionization, etc. Alternatively, ionization in a vacuum regime may be carried out if the device 100 and the tissue 108 are positioned in an appropriately configured vacuum chamber. Examples ionization techniques performed in vacuum include, but are not limited to, glow discharge (GD) ionization, electron ionization (EI) using a filament for thermionic emission, and chemical ionization (CI) using a filament for thermionic emission.

Figure 3:
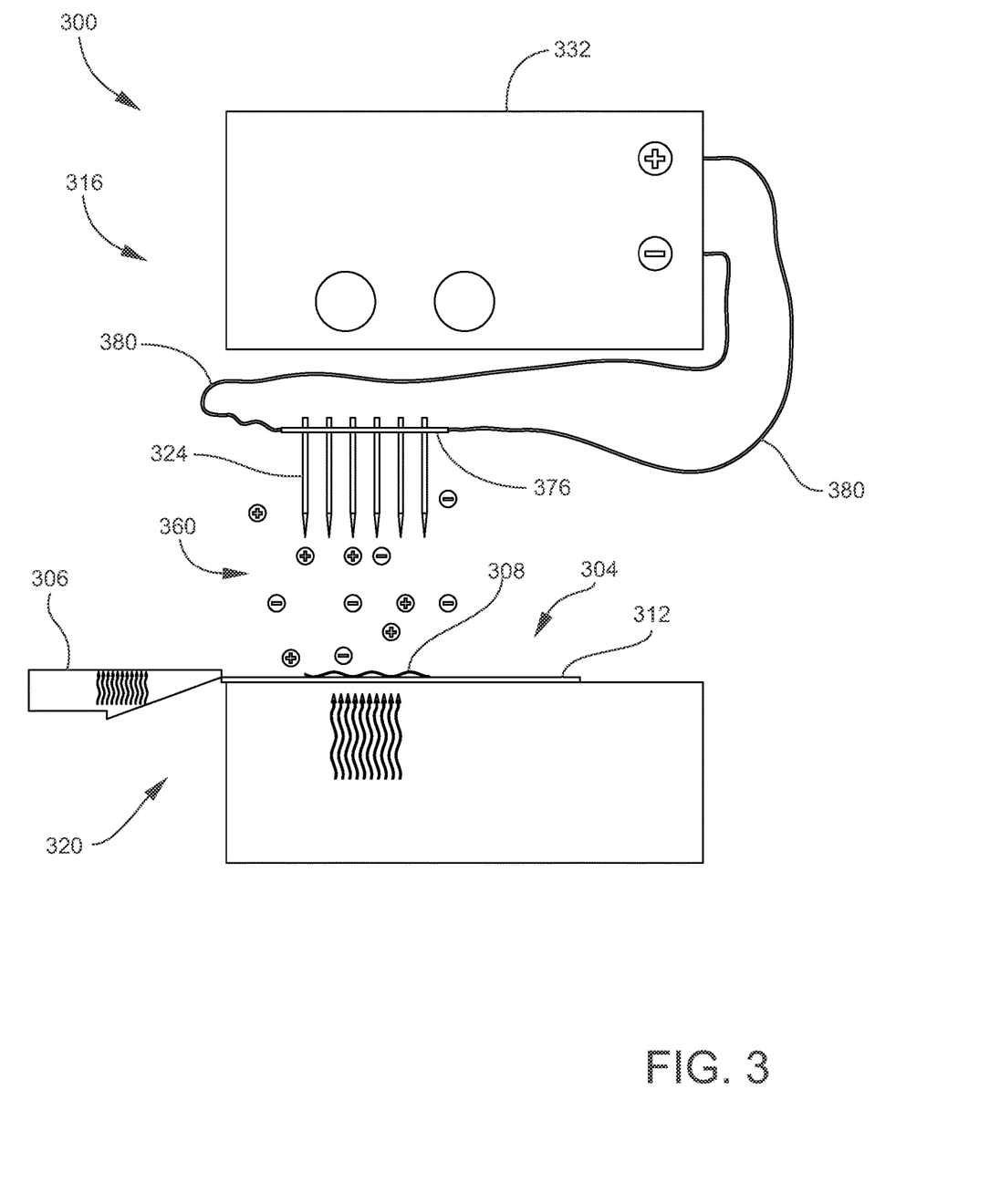
FIG. 3 is a schematic view of a tissue sample preparation device according to another embodiment.

FIG. 3 is a schematic view of a tissue preparation device 300 according to another embodiment. Similar to the embodiment described above and illustrated in FIGS. 1 and 2, the device 300 includes an electric field-generating device 316 and a heating device 320 on which a supported tissue arrangement 304 (paraffin-impregnated tissue 308 on, for example, a microscope slide 312) is supported. In the present embodiment, the electric field-generating device 316 includes a plurality of movable first electrodes 324. The first electrodes 324 may be arranged in a one-dimensional or two-dimensional array. The first electrodes 324 may be spaced from each other by a fixed distance (or pitch). The first electrodes 324 may be (removably) mounted to an appropriately configured electrode support 376 that determines the positions and spacing of the first electrodes 324 relative to each other. In some embodiments, the electrode support 376 may be electrically conductive to minimize the amount of electrical wiring 380 needed between the first electrodes 324 and a voltage source (electrical power supply) 332. The electric field-generating device 316 may further include electrically insulating and/or thermally insulating structures (not shown) attached to or otherwise mechanically referenced to the electrode support 376 and/or the first electrodes 324 as needed to facilitate manual or automated movement of the first electrodes 324 across the tissue 308. For example, electrically insulating and/or thermally insulating structures may be provided in the form of a user-graspable handle or a fixture configured for coupling to a motorized stage or robot. Also in the illustrated example, the voltage source 332 is provided in a control console that includes user-operated control knobs for adjusting voltage, or both voltage and frequency in the case of an AC voltage source.

The multiple first electrodes 324 may be useful for increasing the overall size or footprint of the active region of plasma 360 generated by the electric field-generating device 316. In this case, the plasma 360 may be shaped as a wide curtain. The device 300 may otherwise generally be configured and operated similarly to the device 100 described above and illustrated in FIGS. 1 and 2.

One or more second electrodes (not specifically shown) utilized as a counter-electrode or ground electrode may be disposed on or integrated with the heating device 320, or otherwise positioned proximate to the tissue 308.

As further shown in FIG. 3, the device 300 (or any of the other embodiments of the tissue preparation device disclosed herein) may include a paraffin collection device 306 utilized to collect the paraffin as it is removed from the tissue 308. The paraffin collection device 306 may be movable, or its position adjustable, relative to the heating surface of the (main) heating device 320. In some embodiments, the paraffin collection device 306 may be composed of a thermally conductive material and in operation may be heated to assist in the paraffin removal. Accordingly, the paraffin collection device 306 may also be referred to herein as a second heating device. The paraffin collection device 306 may be utilized, for example, to assist in "wicking away" the paraffin as the paraffin is moved ("pushed" or "pulled," or repelled or attracted, as described herein) to one side of the substrate 312 (the left side in FIG. 3). For this purpose, the paraffin collection device 306 may be heated to (operate at) a higher temperature than that of the heating surface of the (main) heating device 320 (and the paraffin) to cause the paraffin to readily flow onto the paraffin collection device 306 as the paraffin reaches the end of the substrate 312.

Figure 4:
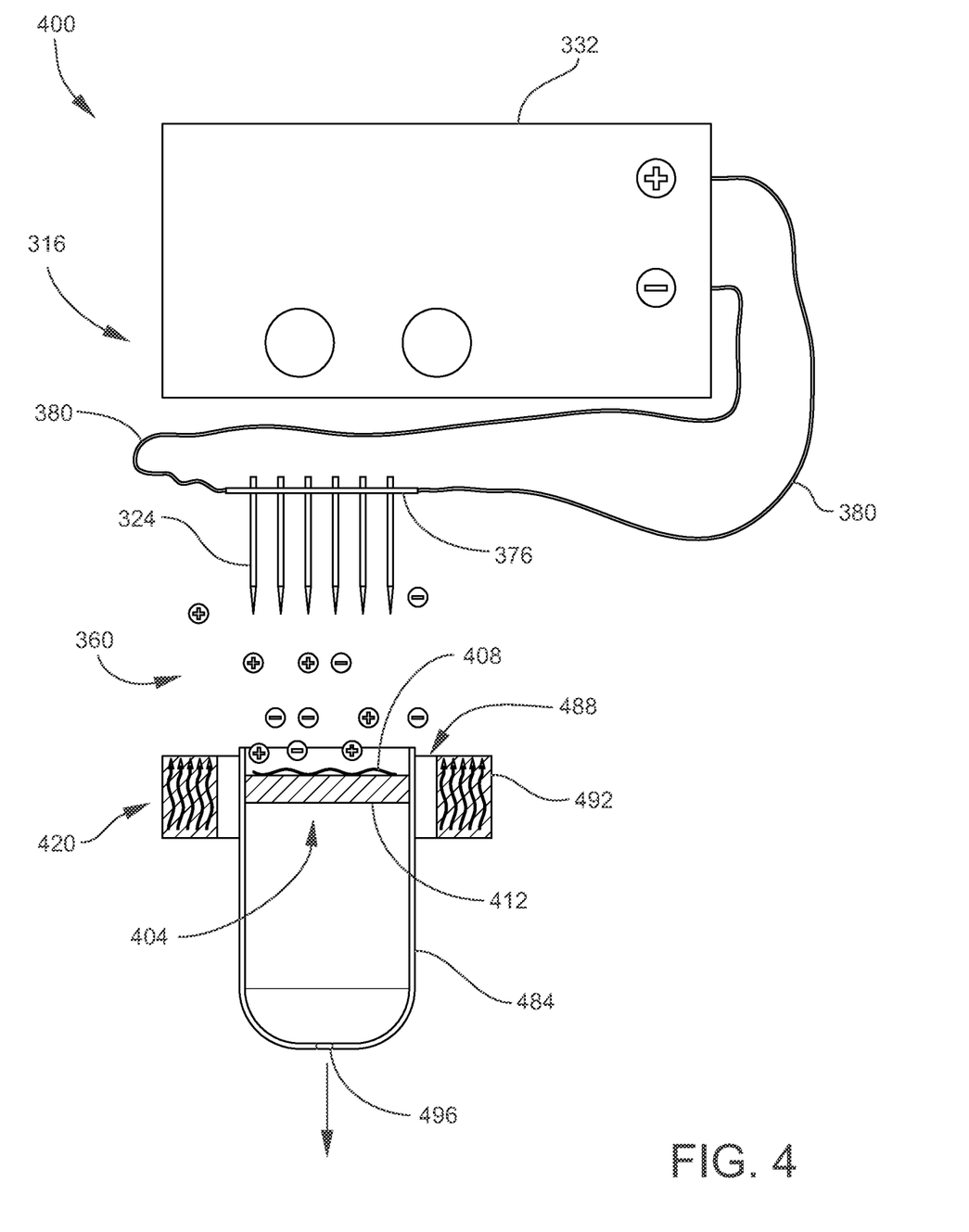
FIG. 4 is a schematic view of a tissue sample preparation device according to another embodiment.

FIG. 4 is a schematic view of a tissue preparation device 400 according to another embodiment. Similar to other embodiments described herein, the device 400 includes an electric field-generating device 316 and a heating device 420 near which a supported tissue arrangement 404 is positioned. By way of example, the electric field-generating device 316 with multiple first electrodes 324 described above is also provided in the present embodiment, although any of the other electric field-generating devices described herein may be included in the tissue preparation device 400. In the present embodiment, a paraffin-impregnated tissue 408 is supported on a solid substrate in the form of a porous frit 412, which may be made of glass or other material capable of withstanding the heat applied during tissue removal. The frit 412 may be removably mounted in a liquid container 484 (e.g., column, vial, test tube, vessel, flask, well of a microtiter plate, etc.) such as at or near the open top of the container 484. The container 484 may be removably mounted in an opening 488 of a container support 492 (e.g., a support plate with one or more openings). The container support 492 may include an array of openings 488 for supporting respective containers 484 and corresponding tissues 408 and fits 412.

In the present embodiment, all or part of the heating device 420 may be integrated with the container support 492. For example, the heating device 420 may include a plurality of circumferentially spaced (relative to the longitudinal axis of the container support 492) heating elements positioned on or in the container support 492 in close enough proximity to the tissue sample 404 to be in thermal contact with the tissue 408. In the present context, the term "in thermal contact" generally may be taken to mean that the heating elements are positioned close enough to the tissue 408 such that when they are activated they establish a thermal gradient effective for transferring an amount of heat to the tissue 408 needed to melt the tissue 408 within a short period of time, for example within a minute or a few minutes.

One or more second electrodes (not specifically shown) utilized as a counter-electrode or ground electrode may be disposed on or integrated with the heating device 420, or otherwise positioned proximate to the tissue 408.

In the present embodiment, as the paraffin is removed from the tissue 408 by the moving first electrodes 324, the paraffin may drain through the holes or pores of the frit 412 and be collected in the container 484. The tissue sample 404 (deparaffinized tissue 408 and frit 412) may then be placed in another container for further processing as needed. In some embodiments, the container 484 may include an opening 496 at its base to allow the paraffin to drain out from the container 484.

In other embodiments of tissue samples, the tissue may be disposed directly on a surface of a liquid container (e.g., column, vial, test tube, vessel, flask, well of a microtiter plate, etc.), in which case the liquid container serves as the solid support for the tissue.

In the embodiments described and illustrated thus far, the tissue (and underlying substrate, if provided) have been depicted as being horizontally oriented. However, the tissue (and underlying substrate, if provided) may be oriented vertically (ninety degrees relative to a horizontal reference plane) or at any angle between the horizontal and vertical reference planes (in a range from zero degrees to ninety degrees relative to a horizontal reference plane). Orienting the tissue at an angle to the horizontal may enhance paraffin removal through the assistance of gravity.

Various other embodiments of a tissue sample preparation device encompassed by the present disclosure may include combinations of features from different embodiments described above.

EXEMPLARY EMBODIMENTS

Exemplary embodiments provided in accordance with the presently disclosed subject matter include, but are not limited to, the following:

1. A method for preparing a tissue, the method comprising:
providing a tissue embedded with paraffin; and
removing the paraffin from the tissue without adding any liquid to the tissue, wherein removing the paraffin renders the tissue substantially free of paraffin.

2. The method of embodiment 1, wherein removing the paraffin from the tissue without adding any liquid to the tissue comprises:
applying heat energy to the tissue effective to melt the paraffin;
applying an electric field effective to ionize the paraffin and to move the ionized paraffin out from the tissue due to electrostatic force; and
continuing to apply the electric field until the tissue is substantially free of paraffin.

3. A method for preparing a tissue, the method comprising:
providing a tissue embedded with paraffin;
applying heat energy to the tissue effective to melt the paraffin;
applying an electric field effective to ionize the paraffin and to move the ionized paraffin out from the tissue due to electrostatic force; and
continuing to apply the electric field until the tissue is substantially free of paraffin.

4. The method of any of the preceding embodiments, wherein providing the tissue comprises placing the tissue on a solid substrate.

5. The method of embodiment 4, wherein the solid substrate is selected from the group consisting of a slide, a plate, a frit, beads, a porous medium, a filter, and a liquid container.

6. The method of embodiment 4 or 5, wherein the solid substrate comprises a substrate surface contacting the tissue, and the substrate surface has a higher surface energy than the paraffin.

7. The method of any of embodiments 2-6, wherein the applying heat energy is performed by one selected from the group consisting of:
placing the tissue sample on a surface and heating the surface;
placing the tissue sample in a chamber and heating the chamber;
applying radiant heat energy;
applying infrared radiation; and
a combination of two or more of the foregoing.

8. The method of any of embodiments 2-7, wherein the applying heat energy comprises heating the paraffin to a temperature in a range from about 35° C. to about 70° C.

9. The method of any of embodiments 2-8, wherein the electric field is a DC electric field.

10. The method of any of embodiments 2-8, wherein the electric field is an AC electric field.

11. The method of any of embodiments 2-10, comprising applying the electric field so as to produce a plasma in an ionization region to which the paraffin is exposed.

12. The method of embodiment 11, wherein the plasma is produced from air molecules.

13. The method of any of embodiments 2-12, wherein applying the electric field comprises applying a voltage between a first electrode and a second electrode.

14. The method of embodiment 13, wherein the voltage has an absolute value in a range from about 1000 V to about 30,000 V.

15. The method of embodiment 13 or 14, wherein applying the electric field produces a corona discharge in a region surrounding the first electrode, and further comprising positioning the first electrode so as to expose the paraffin to the corona discharge.

16. The method of any of embodiments 13-15, wherein the first electrode comprises a curved feature configured to generate a region of elevated electric field strength surrounding the first electrode.

17. The method of embodiment 16, wherein the curved feature comprises an edge or a tip of the first electrode.

18. The method of any of embodiments 13-17, wherein the second electrode is a planar electrode.

19. The method of any of embodiments 13-18, comprising electrically grounding the second electrode while applying the electric field.

20. The method of any of embodiments 13-19, comprising moving at least one of the first electrode and the tissue relative to the other, in a direction that moves the paraffin away from the tissue.

21. The method of any of embodiments 13-20, wherein the first electrode comprises an array of electrodes.

22. The method of any of embodiments 13-21, wherein the tissue is positioned between the first electrode and the second electrode.

23. The method of any of the preceding embodiments, wherein providing the tissue comprises positioning the tissue in or above a container, and further comprising collecting the paraffin in the container after moving the paraffin out from the tissue.

24. The method of any of embodiments 2-23, comprising moving at least one of the electric field and the tissue relative to the other, in a direction that moves the paraffin away from the tissue.

25. The method of any of embodiments 2-24, comprising applying the heat energy while applying the electric field.

26. The method of any of the preceding embodiments, comprising staining the tissue after removing the paraffin.

27. The method of embodiment 26, wherein staining the tissue comprises staining with an immunohistochemical staining agent.

28. The method of any of the preceding embodiments, comprising isolating nucleic acids from the tissue after removing the paraffin.

29. The method of any of the preceding embodiments, wherein after removing the paraffin from the tissue, or after applying the electric field, the tissue is greater than 98% free of paraffin.

30. A method for preparing a tissue, the method comprising:
providing a tissue embedded with paraffin; and
removing substantially all of the paraffin from the tissue without adding any liquid to the tissue.

31. The method of embodiment 30, wherein removing substantially all of the paraffin from the tissue removing greater than 98% of the paraffin.

32. The method of embodiment 30, wherein after removing substantially all of the paraffin from the tissue, the tissue contains residual paraffin, and the residual paraffin is less than 2% of the paraffin originally contained in the tissue prior to the step of removing.

33. A tissue preparation device, comprising an electric field-generating device configured for applying the electrical field according to the method of any of the preceding embodiments.

34. The tissue preparation device of embodiment 33, comprising a heating device configured for applying the heat energy.

35. A tissue preparation device, comprising:
a heating device configured for applying heat energy to a tissue effective to melt paraffin embedded in the tissue; and
an electric field-generating device configured for applying an electrical field effective to ionize the paraffin and to move the ionized paraffin out from the tissue due to electrostatic force.

36. The tissue preparation device of embodiment 35, wherein the electric field-generating device is configured for applying the electric field effective to produce plasma in an ionization region to which the paraffin is exposed.

37. The tissue preparation device of embodiment 35 or 36, wherein the electric field-generating device comprises a first electrode and a second electrode, and the electric field-generating device is configured for applying the electric field between the first electrode and the second electrode.

38. The tissue preparation device of embodiment 37, wherein the first electrode comprises a curved feature configured to generate a region of elevated electric field strength surrounding the first electrode.

39. The tissue preparation device of embodiment 37 or 38, wherein the first electrode is configured for being moved relative to the tissue.

It will be understood that terms such as "communicate" and "in communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for deparaffinizing a tissue, the method comprising:
   providing a tissue embedded with paraffin;
   applying heat energy to the tissue effective to melt the paraffin; and
   applying an electric field effective to move the paraffin out from the tissue by electrostatic force.

2. The method of claim 1, comprising
   continuing to apply the electric field until the tissue is substantially free of paraffin.

3. The method of claim 1, wherein the applying heat energy is performed by a process selected from the group consisting of:
   placing the tissue sample on a surface and heating the surface;
   placing the tissue sample in a chamber and heating the chamber;
   applying radiant heat energy;
   applying infrared radiation;
   applying heat energy so as to heat the paraffin to a temperature in a range from about 35° C. to about 70° C.; and
   a combination of two or more of the foregoing.

4. The method of claim 1, comprising applying the electric field so as to produce a plasma in an ionization region to which the paraffin is exposed.

5. The method of claim 4, wherein the plasma is produced from air molecules.

6. The method of claim 1, wherein applying the electric field comprises applying a voltage between a first electrode and a second electrode.

7. The method of claim 6, wherein applying the electric field produces a corona discharge in a region surrounding the first electrode, and further comprising positioning the first electrode so as to expose the paraffin to the corona discharge.

8. The method of claim 6, wherein the first electrode has a configuration selected from the group consisting of:
   the first electrode comprises a curved feature configured to generate a region of elevated electric field strength surrounding the first electrode; and
   the first electrode comprises a curved feature configured to generate a region of elevated electric field strength surrounding the first electrode, wherein the curved feature comprises an edge or a tip of the first electrode.

9. The method of claim 6, wherein the second electrode is a planar electrode.

10. The method of claim 6, comprising moving at least one of the first electrode and the tissue relative to the other, in a direction that moves the paraffin away from the tissue.

11. The method of claim 6, wherein the first electrode comprises an array of electrodes.

12. The method of claim 6, wherein the tissue is positioned between the first electrode and the second electrode.

13. The method of claim 1, comprising moving at least one of the electric field and the tissue relative to the other, in a direction that moves the paraffin away from the tissue.

14. The method of claim 1, comprising applying the heat energy while applying the electric field.

15. The method of claim 1, wherein providing the tissue comprises a step selected from the group consisting of:
   placing the tissue on a solid substrate;
   placing the tissue on a slide;
   placing the tissue on a plate;
   placing the tissue on beads;
   placing the tissue on a porous medium;
   placing the tissue on a filter;
   placing the tissue in a liquid container; and
   placing the tissue on a substrate surface having a higher surface energy than the paraffin.

16. The method of claim 1, wherein providing the tissue comprises positioning the tissue in or above a container, and further comprising collecting the paraffin in the container after moving the paraffin out from the tissue.

17. The method of claim 1, comprising staining the tissue after removing the paraffin.

18. The method of claim 17, wherein staining the tissue comprises staining with an immunohistochemical staining agent.

19. The method of claim 1, comprising isolating nucleic acids from the tissue after removing the paraffin.

* * * * *